United States Patent [19]

Sawyer, Jr.

[11] 4,422,855
[45] Dec. 27, 1983

[54] METHOD OF THICKENING SOLUTIONS USING NORMALLY NONGELLING CLAYS

[75] Inventor: Edgar W. Sawyer, Jr., Hagerstown, Md.

[73] Assignee: International Telephone and Telegraph Corporation, New York, N.Y.

[21] Appl. No.: 263,808

[22] Filed: May 15, 1981

[51] Int. Cl.³ .......................... C10L 1/32; B01J 13/00
[52] U.S. Cl. ................................... 44/51; 71/64.08; 252/8.5 B; 252/315.1; 252/315.5
[58] Field of Search ............ 252/8.5 A, 8.5 B, 8.5 M, 252/315.5, 315.2, 315.1; 44/51; 71/64.08

[56] References Cited

U.S. PATENT DOCUMENTS

| | | | |
|---|---|---|---|
| 2,335,146 | 11/1943 | Ford et al. | 252/8.5 |
| 2,393,174 | 1/1946 | Larsen | 252/8.5 |
| 2,702,788 | 2/1955 | Dawson | 252/8.5 |
| 2,797,196 | 6/1957 | Dunn et al. | 252/8.5 |
| 2,885,360 | 5/1959 | Hayden et al. | 252/8.5 X |
| 3,216,934 | 11/1965 | Reinhard | 252/8.5 |
| 3,220,947 | 11/1965 | Sawyer | 252/8.5 |
| 4,147,519 | 4/1979 | Sawyer | 44/51 |

FOREIGN PATENT DOCUMENTS 1500901 2/1978 United Kingdom ................ 252/8.5

OTHER PUBLICATIONS

Gray et al., *Composition and Properties of Oil Well Drilling Fluids*, Fourth Edition, Pub. Feb. 1980, pp. 164, 165 and 537–541.

*Primary Examiner*—Herbert B. Guynn
*Attorney, Agent, or Firm*—James B. Raden

[57] ABSTRACT

Normally nongelling montmorillonite clay is treated to have gelling characteristics by drying the clay to 10 to 15 percent free moisture and grinding the clay to at least 100 percent finer than 45 microns. To thicken an aqueous solution, the clay is dispersed in water with a chemical dispersant and the predispersion is agitated in the aqueous liquid with a flocculent. To thicken an organic liquid, the dried and ground clay is stirred into the liquid with a surfactant.

14 Claims, No Drawings

METHOD OF THICKENING SOLUTIONS USING NORMALLY NONGELLING CLAYS

BACKGROUND OF THE INVENTION

This invention relates to gelling clays and, more particularly, to a method of treating normally nongelling clays so that they may be used as gelling agents for thickening aqueous and organic liquid systems.

Certain clay mineral products are known as gelling clays. Such clays are used for thickening drilling muds, liquid animal feeds, suspension fertilizers, asphalt cutbacks and oil base foundry sand binders, and are also used for stabilizing coal/oil mixtures.

Typical gelling clays include Wyoming bentonite, attapulgite, sepiolite, and hectorite. These gelling clays can be used to thicken water by stirring a prescribed amount of clay into the water. The amount of thickening achieved is a direct function of the amount of clay used and the amount of work put into the system by agitation shear. These same clays can be used to thicken organic liquids by pretreating the clays with certain organic surfactants prior to agitating into the liquid, or by adding the clays to the liquid at the same time as the surfactant and accomplishing interaction of the clay and surfactant in situ.

Of the above clays, Wyoming bentonite and hectorite are platy clays that are able to imbibe water and swell to achieve their thickening effect. Swelling is an inherent property of these clay minerals because of the cations (type of cation) between adjacent platelets which are of a type (NA+ for example) that allows them to take up water. When the ionic content of the water is high, they will not imbibe water and thus are not thickeners for salt-containing solutions.

Attapulgite, sepiolite and palygorskite are acicular clay minerals that can be made to thicken water by merely stirring them into the water. Thickening is achieved with these minerals by the individual needles being separated and interacting in an extended gal structure to thicken the continuous water phase. Because of their method of building viscosity, this group of minerals will effectively thicken water solutions containing high ionic concentrations; e.g., saturated NaCl, gypsum, $MgSO_4$, etc., and are commonly used commercially when contamination with these materials is encountered.

All of these clay minerals can be predispersed in water with a chemical dispersant such as sodium hexametaphosphate sold under the tradename Calgon by Merck, TSPP (tetrasodium pyrophosphate) and certain phosphate glasses, and used as thickeners by reflocculating the clay by either adding a neutralizing agent for the dispersant (salts containing $Ca++$, $Al+++$ or other polyvalent cations) or adding enough ionic material to collapse the double layer. Water systems thickened with platy gelling grade minerals such as Wyoming bentonite tend to be unstable when high concentrations of ionic materials or lower concentrations of polyvalent cations are added. Water systems thickened with reflocculated acicular clays not only tend to be more stable but also exhibit a higher gelling efficiency than when the same liquids are thickened with dry (undispersed) clay additions.

Certain montmorillonite type clays that occur in the region of Ochlocknee, Ga. are classified as nonswelling clays because they show little ability to thicken or gel water. This is a result of the ionic types ($Al^{+3}$ and some $Ca^{+2}$) existing between their plates which do not permit an autogenous imbibing of water or swelling. In fact these clays will not gel water even with high-shear agitation. The clays are mined commercially and are thermally and mechanically processed to produce granular absorbants that are sold as oil and grease absorbants, pet litters, agricultural chemical carriers, etc..

SUMMARY OF THE INVENTION

According to the present invention, I have discovered that montmorillonite type clays may be treated so as to provide them will gelling characteristics. To make the clays suitable as gellants in aqueous systems, the clays are dried to 10 to 15 percent free moisture and ground to essentially 100 percent finer than 45 microns. The dried and ground clay is dispersed in water with a chemical dispersant and thereafter the mixture is added to the system to be gelled along with a flocculent of a type which neutralizes the dispersing ability of the dispersant. Surprisingly, high ionic content aqueous systems gelled with this type of predispersed montmorillonite clay exhibit good stability. The same dried and ground clay may be also utilized as a gellant for organic liquids when stirred into the liquid with a suitable surfactant.

DESCRIPTION OF THE PREFERRED EMBODIMENTS

Tests which I have carried out so far in practicing the present invention have been with aluminum and calcium montmorillonite clays. The aluminum montmorillonite clays were from Ochlocknee, Ga. Table I sets forth a typical chemical analysis of the aluminum montmorillonite clay. Although the constituents listed in the table are represented as percentages of oxides, the constituents are actually present in the clay as complex alumino silicates. The percentages appearing in Table I are based upon a volatile free basis (1200° F.).

TABLE I

| Constituents | PERCENT |
| --- | --- |
| Si as $SiO_2$ | 69.49 |
| Fe as $Fe_2O_3$ | 7.94 |
| Al as $Al_2O_3$ | 16.65 |
| Ti as $TiO_2$ | 0.56 |
| Ca as CaO | 0.04 |
| Mg as MgO | 1.78 |
| Na as $Na_2O$ | 0.15 |
| K as $K_2O$ | 0.06 |
| C as $CO_2$ | 0.15 |
| S as $SO_2$ | 2.63 |
| P as $P_2O_5$ | 0.55 |
| TOTAL | 99.90 |

The following describes several tests which have been conducted to demonstrate the utilization of the present invention for thickening aqueous systems.

EXAMPLE 1

A crude clay from an Ochlocknee aluminum montmorillonite deposit was crushed to 100 percent finer than 6 mesh, dried in a 105° F. oven to 12 percent free moisture content and ground through a hammer mill to about 100 percent through 325 mesh (45 microns). The final free moisture of the powdered clay was 10.5 percent. Dispersions of this clay were made up as shown in Table II using TSPP as the dispersing agent. Mixing equipment used was a medium-shear Sterling Multimixer. Processing consisted of dissolving the TSPP in the water or urea solution while stirring, adding the clay and continuing agitation until all of the powdered clay had dispersed—about 10 minutes.

TABLE II

Clay Dispersions and Evaluations
Samples (each formulation expressed in parts by weight)

| | A | B | C | D | E | F | G | H | I |
|---|---|---|---|---|---|---|---|---|---|
| Constituents | | | | | | | | | |
| Water | 299.5 | 299.0 | 298.5 | 298.0 | 297.5 | 297.0 | — | 300.0 | — |
| 20% Urea Solution | — | — | — | — | — | — | 298.0 | — | 300.0 |
| TSPP | 0.5 | 1.0 | 1.5 | 2.0 | 2.5 | 3.0 | 2.0 | — | — |
| Clay | 100.0 | 100.0 | 100.0 | 100.0 | 100.0 | 100.0 | 100.0 | 100.0 | 100.0 |
| | 400.0 | 400.0 | 400.0 | 400.0 | 400.0 | 40.0 | 400.0 | 400.0 | 400.0 |
| Comments/Evaluations: | Dispersed | Dispersed | Dispersed | Dispersed | Dispersed | Dispersed | Dispersed | Settled Out | Settled Out |
| Brookfield Visc., cps. 10/100 RPM | 400/120 | 140/120 | 140/120 | 140/120 | 120/116 | 120/108 | 220/160 | — | — |
| Suspension Test | | | | | | | | | |
| Initial Brookfield Visc., cps. 60 RPM | 750 | 900 | 1000 | 1200 | 1200 | 1700 | 1200 | 300 | 350 |

Tests which I will hereinafter call the Suspension Tests were performed for evaluation of the 25 percent predispersions (PD clay) shown in Table II. In the tests a simulate 3-10-27 suspension fertilizer was used made with the following ingredients:

| | |
|---|---|
| Water | 190 g |
| PD Clay | 80 g (2% clay on a dry basis) |
| 10-34-0 | 295 g |
| Powdered KCl | 435 g |
| | 1000 g |

The product 10-34-0 is an ammonium phosphate solution in water made with a TVA pipe reactor. It contains about 60% polyphosphate. Each test was run in a Waring blender with the speed controlled by a variable transformer (Powerstat). While running at 100 volts, the water and PD clay sample were mixed for one minute. The 10-34-0 was added while stirring and was stirred for three minutes. The KCl flocculent was added and the voltage was increased to 120 volts. After all of the KCl had been incorporated, the mix was stirred for 5 minutes at 120 volts. The Brookfield viscosity at 60 RPM's was determined after processing. Each finished sample was stored in a 1000 ml cylinder overnight and examined for settling, supernatant liquid (SN) and sediment after storage. Each sample was made uniform and rechecked for Brookfield viscosity after desired storage periods; e.g., 24 hrs., 48 hrs., 1 week, 1 month, etc. A minimum viscosity of 1200 cp in the Suspension Test is acceptable. As seen in Table II, samples D-G met or exceeded this minimum figure. Thus, TSPP levels of 1.5 percent to 3.0 percent (based on the clay weight) performed satisfactorily in the clay dispersions tested.

To determine if predispersion samples E and G could be made to gel more efficiently, they were restirred for 5 minutes on a high-shear Waring blender. The Suspension Test viscosities obtained after this additional processing are shown in Table III.

TABLE III

| | Initial Brookfield Viscosities at 6 RPM, cp | |
|---|---|---|
| Processing | Sample E | Sample G |
| Medium-Shear Mixing | 1200 | 1200 |

TABLE III-continued

| | Initial Brookfield Viscosities at 6 RPM, cp | |
|---|---|---|
| Processing | Sample E | Sample G |
| Medium-Shear plus high-shear mixing | 1950 | 1950 |

The foregoing indicates that additional high-shear mixing during the preparation of predispersions improves the performance of the PD clay.

EXAMPLE 2

As shown in Table II, initial work on the predispersed montmorillonite was carried out at a 25 percent clay level. To determine if other clay levels would be preferable, the clay of Example 1 was predispersed at 25 percent, 30 percent and 35 percent levels with 3 percent TSPP (% on clay weight). Formulations and evaluation results are shown in Table IV. Processing was under medium-shear conditions. The amount of clay on a dry basis was adjusted to 2 percent in all of the Suspension Tests by adjusting the amount of PD clay added. While all three predispersions performed well in the Suspension Tests, Sample B was the most satisfactory predispersion.

TABLE IV

Effect of Clay Concentration on Viscosity of Predispersions

| | SAMPLES | | |
|---|---|---|---|
| | 25% A | 30% B | 35% C |
| Constituents | | | |
| Water | 297 g | 276.4 g | 255.8 g |
| TSPP | 3 g | 3.6 g | 4.2 g |
| Clay | 100 g | 120.0 g | 140.0 g |
| | 400 g | 400.0 g | 400.0 g |
| Predispersion Characteristics: | | | |
| Appearance | Thin | Med. Visc. | Thick |
| Brookfield Visc., cp 10/100 RPM | 120/116 | 3000/1500 | 10,500/5200 |
| Evaluation: | | | |
| Suspension Test Brookfield Visc., cp, 60 RPM | | | |
| Initial | 1700 | 2000 | 1800 |
| Aged 24 hrs. | 1800 | 2100 | 2150 |
| | no SN, | no SN, | no SN, |

TABLE IV-continued

Effect of Clay Concentration
on Viscosity of Predispersions

| SAMPLES | | |
|---|---|---|
| 25% A | 30% B | 35% C |
| no sed. | no sed. | no sed. |

EXAMPLE 3

To determine the effect of extrusion and extrusion plus soda ash addition on the thickening ability of the montmorillonite clay, crude from Example 1 was pugged with enough water to increase the FM (free moisture) to 51 percent. The extrudate was dried to 15 percent FM in a 105° F. oven and hammer mill ground. The ground clay was predispersed at 30 percent solids with 3 percent TSPP (% on clay weight) and evaluated with the Suspension Test. It was noted that the extruded clay dispersed easier than the previously evaluated unextruded clay. Suspension Test viscosities on the extruded clay were 2050 cp initially and 2250 cp in 24 hours; on the extruded plus one percent soda ash treated clay were 2300 initially and 2350 cp after 24 hours. Because of the easier predispersion, both of these techniques appear worthwhile.

EXAMPLE 4

A second crude montmorillonite sample was processed as described in Example 1. This was checked for viscosifying properties in a series of qualifying tests normally used for colloidal attapulgite. Such tests are the Firetrol Test, the TVA Q-Test and the API Yield Test. Suspension Tests were also performed. Results of the tests on undispersed clay, a 30 percent predispersion dispersed with 3 percent TSPP (% based on the clay weight) and Min-U-Gel 200, a colloidal attapulgite, are shown in Table V.

TABLE V

Gelling Properties of Ochlocknee Montmorillonite

| | SAMPLES | | |
|---|---|---|---|
| | Dry Mont. Clay | 30% PD Mont. Clay | Min-U-Gel 200 |
| FM, % | 16.3 | — | 13.4 |
| API Yield (Bbl/T) | | | |
| Fresh Water | 42 | — (1) | 124 |
| Salt Water | 5 | 88 | 105 |
| Firetrol Test (B. Visc., cp, 60 RPM) | 100 | 5980 (2) | 1800 |
| TVA Q-Test (B. Visc., cp, 100 RPM) | 25 | 215 | 240 |
| Suspension Test (B. Visc., cp, 60 RPM) | 800 settled out | 2000 | 2400 |
| Comments | nongelling clay | fair to good gelling clay in ionic systems | good gelling clay in fresh water and ionic systems |

NOTE:
(1) no gelling, approx. visc. of water
(2) stiff gel

EXAMPLE 5

Tests have also been conducted on two calcium montmorillonite samples obtained from the Source Clay Minerals Repository, Department of Geology, University of Missouri, Columbia, Mo. The samples were (1) STx-1 Ca Montmorillonite (White), Gonzales County, Tex. and (2) SAz-1 Ca Montmorillonite (Cheto), Apache County, Ariz. They are standard reference clay minerals, are nonswelling and are described in detail in "Data Handbook for Clay Materials and Non-Metallic Minerals," edited by Van Olphen and Fripiat, Pergamon Press (1979). Their nonswelling non-gelling characteristics were established by stirring a 30% by weight slurry in distilled water with a Sterling multimixer for 10 minutes. No gel resulted. Similar results were noted when Waring Blender mixing was tried. Samples STx-1 and SAz-1 were predispersed at the 25% level with 3% TSPP (based on the clay weight) in water with a Sterling multimixer using 5 minutes stirring. The predispersed clays were then checked with the Suspension Test. Evaluation results are shown in Table VI.

TABLE VI

Properties of Calcium Montmorillonites

| | Ca. Mont. STx-1 | Ca. Mont. SAz-1 |
|---|---|---|
| Initial Evaluations | | |
| FM, % | 10.5 | 10.9 |
| Dry Screen +325, % (Alpine) | 10.0 | 12.5 |
| API Yields: bbl/ton | | |
| Salt water | No gelling | No gelling |
| Fresh water | " | " |
| Suspension Test | | |
| Brookfield Visc. at 60 RPM in cps | | |
| Dry Clay | 200 | 100 |
| Predispersed Clay | 1300 | 500 |

Because SAz-1 showed poor results it was evaluated further by making up a second 25% predispersion in water with higher-shear mixing equipment, a Waring Blender. The TSPP content was increased to 5% (based on the clay weight). This predispersion was checked with the Suspension Test and gave a 60 RPM Brookfield viscosity of 1100 cps. These results indicate that Ca montmorillonites also are susceptible to the processing techniques of this invention.

While not bound by this theory, it is believed that the predispersion of the nonswelling, nongelling montmorillonite clay with chemical dispersants in water under conditions of medium shear or high shear results in a delaminating type of cleavage across the "C" axis of the clay crystal which generates many thinner flakes. When the thin flakes adsorb dispersant, they are charged up and exhibit the low viscosities characterisitc of mineral dispersions. However, when the protective charge mechanism is destroyed by floccing the clay particles, the particles interact to give a viscosity-producing gel structure.

Floccing of the clay predispersion may be accomplished by one of dispersant neutralizers such as soluble polyvalent cations (salts containing $Ca++$, $Al+++$, for example) which react with the dispersant, or high ionic concentrations ($K+$, $NH_4+$, $Na+$ for example) to collapse the charge layer of the dispersed particles.

Various inorganics have been used for many years as gelling agents for organic liquids such as petroleum fractions (naphthas, mineral spirits, lube oils) alkyd resins, alcohols, polyethers and many others. Mineral gellants have included etherified hydrophobic amorphous silicas (Estersils), amorphous silica aerogels and fumed silicas treated with cationic surfactants, Wyoming bentonite clay reacted with amine salts or quaternary nitrogen compounds (Bentones), hectorite clay reacted with quaternary nitrogen compounds, and colloidal attapulgite treated with imidazolines or alkanolamides. Oils gelled with clay/surfactant combinations have many things in common—the resultant gels are thixotropic, pseudo-plastic, exhibit good gel strenghts and are very heat resistant. Heat resistance is very important in such applications as high temperature greases. Recently a new application has been devised for attapulgite/surfactant gelled oils. They are coal/oil mixtures (C/OM) which consist of about 50 percent finely ground coal dispersed in fuel oil with the attapulgite clay/surfactant as a gellant for the oil phase in order to suspend the coal particles.

The present invention also constitutes the discovery that properly prepared aluminum montmorillonite clay can be used in this application and in other organic liquid-gelling applications along with surfactants to achieve excellent results. The following examples are illustrative of my invention.

EXAMPLE 6

Montmorillonite clays prepared as described in Example 1 were checked for gelling properties in #6 fuel oil by dissolving Amine T (the imidazoline of tallow fatty acid and aminoethylethanolamine) at 180° F., adding the clay while stirring with a double bladed Sterling Multimixer and continuing mixing until the clay is gelled (approximately 5 minutes). Formulations made on three montmorillonite clay samples and an attapulgite clay control plus evaluation results are shown in Table VII.

TABLE VII

Clay Gels in #6 Fuel Oil

| Constituents: | Montmorillonite Clay Samples | | | Attapulgite Clay Sample Min-U-Gel |
| --- | --- | --- | --- | --- |
| | A | B | C | FG |
| #6 Fuel Oil | 433.5 g | 433.5 g | 433.5 g | 433.5 g |
| Amine T | 16.5 g | 16.5 g | 16.5 g | 16.5 g |
| Clay | | | | |
| A (Mont.) | 50.0 g | — | — | — |
| B (Mont.) | — | 50.0 g | — | — |
| C ... (Mont.) | — | — | 50.0 g | — |
| Min-U-Gel FG* | — | — | — | 50.0 g |
| | 500.0 g | 500.0 g | 500.0 g | 500.0 g |
| Appearance | Med. | Med. to thin | Med. thick | No thickening |
| Brookfield Visc. in cp: | | | | |
| Initial at 180° F. | | | | |
| 10 RPM | 7200 | 5400 | 10400 | — |
| 100 RPM | 1332 | 1080 | 1580 | — |
| Aged 2 weeks at 180° F. | | | | |
| 10 RPM | 8800 | 4800 | 9200 | — |
| 100 RPM | 1800 | 1140 | 1920 | — |
| Aged 1 Month at 180° F. | | | | |
| 10 RPM | 3800 | 1400 | 4300 | — |
| 100 RPM | 840 | 480 | 930 | — |

*A finely-ground, colloidal attapulgite clay

EXAMPLE 7

Montmorillonite clay was processed as in Example 1. The clay was pregelled in #6 fuel oil using Amine T as the surfactant as described in Example 6 with the order of addition listed in Table VIII. Next, 50 percent of a Kentucky bituminous coal ground to 80 percent −200 mesh was added with additional stirring. Formulations tried and evaluation results are shown in Table VIII. Note that Samples A and B in Table VIII contained a solution of Amine T (10%). The extra water is lost during processing and storage. Sample C was processed with undilute Amine T. The best results were achieved with Sample C; second best was Sample A, and Sample B was successful if used within two weeks of processing.

TABLE VIII

50% C/OM Stabilized With Montmorillonite Clay and Amine T

| Constituents | SAMPLES | | |
| --- | --- | --- | --- |
| | A | B | C |
| 6 Fuel Oil | 100.0 g | 100.0 g | 100.0 g |
| Amine T (10% Solution) | 16.6 g | 8.3 g | — |
| Amine T | — | — | 0.83 g |
| Clay | 5.0 g | 2.5 g | 2.5 g |
| Oil | 143.3 g | 148.3 g | 148.3 g |
| Coal | 250.0 g | 250.0 g | 250.0 g |
| Comments: | | | |
| Clay, % | 1 | 0.5 | 0.5 |
| Clay/Surfactant Ratio | 3/1 | 3/1 | 3/1 |
| Evaluations: Brookfield Visc., cps. | (Stored and Evaluated at 160° F.) | | |
| Initial 10/100 RPM | 15,200/3640 | 3400/1580 | 5200/1700 |
| 24 hrs., 10/100 RPM | 19,000/4900 v. thick | 4400/2000 no sed. | 6400/2400 no sed. |
| 1 Week, 10/100 RPM | 15,200/4000 | 2800/1880 | 5200/2440 |
| 2 Weeks, 10/100 RPM | 15,000/4000 | 2600/1920 | 2800/2080 |
| 1 Month, 10/100 RPM | 8000/3300 no SN, no sed. | hard sediment | 1200/1400 no SN, no sed. |

Thus, in conclusion, the present invention constitutes the discovery that the previously held assumption that nongelling montmorillonite clays cannot be used as gellants because of their generally accepted nongelling characteristics is false. Special processing and formulation of such clays in accordance with the invention described herein renders the clays suitable for gelling both aqueous and organic liquid systems.

I claim:

1. A method of thickening an aqueous solution using a normally nongelling clay comprising the steps of:
   providing a nongelling clay selected from the group consisting of aluminum montmorillonite and calcium montmorillonite;
   drying the clay to 10 to 15 percent free moisture;
   grinding the clay to at least 100 percent finer than about 45 microns;
   adding a condensed phosphate dispersant to the clay and forming a predispersion;
   providing a flocculent capable of neutralizing the dispersant;
   adding the predispersion and flocculent to an aqueous solution; and
   stirring the solution until said solution thickens.

2. A method as set forth in claim 1 wherein:
   said flocculent is selected from the group consisting of (1) a polyvalent cation that reacts with said dispersant and (2) a solution containing a high concentration of dissolved ions of the type that are capable of collapsing the protective dispersant charge layer on the clay particles.

3. A method of thickening an aqueous liquid using a normally nongelling clay comprising the steps of:
drying nongelling aluminum or calcium montmorillonite clay to 10 to 15 percent free moisture;
grinding the clay to at least 100 percent finer than about 45 microns;
dispersing the clay in water or urea aqueous solution with a condensed phosphate dispersant producing a predispersion;
adding the predispersion to the aqueous liquid to be thickened with a flocculent capable of neutralizing the dispersant;
agitating the resulting product until the clay gels.

4. A method as set forth in claim 3 wherein:
said dispersant is tetrasodium pyrophosphate (TSPP); and
said flocculent is capable of neutralizing the dispersing characteristics of said TSPP.

5. A method as set forth in claim 4 wherein:
said flocculent is a solution containing a high concentration of dissolved ions of the type that are capable of collapsing the protective dispersant charge layer on the clay particles.

6. A method as set forth in claim 4 wherein:
said TSPP is present in an amount equal to about 2 to 3 percent by weight of said clay on an as is basis.

7. A method as set forth in claim 4 wherein:
said clay is present in said predispersion in an amount equal to about 25 to 35 percent of the total weight of the predispersion.

8. A method as set forth in claim 4 wherein:
said predispersion is produced by relatively high-shear mixing.

9. A method as set forth in claim 4 wherein:
said clay is extruded prior to forming said predispersion.

10. A method as set forth in claim 9 wherein:
soda ash is added to the clay prior to extrusion.

11. A method of thickening an organic liquid using a normally nongelling clay comprising the steps of:
drying nongelling aluminum or calcium montmorillonite clay to 10 to 15 percent free moisture;
grinding the clay to at least 100 percent finer than about 45 microns;
adding the clay with a surfactant selected from the group consisting of a quaternary ammonium compound, an amine salt, an imidazoline and an alkanolamide to an organic liquid; and
agitating the resulting product until the clay gels.

12. A method as set forth in claim 11 wherein:
ground coal is stirred into said product.

13. A method of thickening an organic liquid using a normally nongelling clay comprising the steps of:
drying nongelling aluminum or calcium montmorillonite clay to 10 to 15 percent free moisture;
grinding the clay to at least 100 percent finer than about 45 microns;
adding the clay with an imidazoline of tallow fatty acid and aminoethylethanolamine to an organic liquid; and
agitating the resulting product until the clay gels.

14. A method as set forth in claim 13 wherein:
ground coal is stirred into said product.

* * * * *